(12) United States Patent
O'Laughlin et al.

(10) Patent No.: US 10,528,043 B2
(45) Date of Patent: Jan. 7, 2020

(54) SYSTEMS AND METHODS FOR MAXIMIZING TIME RELIABILITY AND FUEL-EFFICIENCY FOR AN AIRCRAFT TO MEET CONSTRAINTS ASSOCIATED WITH A REQUIRED TIME OF ARRIVAL (RTA)

(71) Applicant: HONEYWELL INTERNATIONAL INC., Morris Plains, NJ (US)

(72) Inventors: Brian O'Laughlin, Humboldt, AZ (US); Mike Jackson, Maple Grove, MN (US); Rajesh Chaubey, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 240 days.

(21) Appl. No.: 15/658,669

(22) Filed: Jul. 25, 2017

(65) Prior Publication Data

US 2019/0033853 A1    Jan. 31, 2019

(51) Int. Cl.
| | | |
|---|---|---|
| *G05D 1/00* | (2006.01) | |
| *G08G 5/00* | (2006.01) | |
| *B64D 37/00* | (2006.01) | |
| *G01C 23/00* | (2006.01) | |
| *G06F 3/0488* | (2013.01) | |

(52) U.S. Cl.
CPC ......... *G05D 1/0005* (2013.01); *B64D 37/005* (2013.01); *G08G 5/0021* (2013.01); *G08G 5/0039* (2013.01); *G08G 5/0052* (2013.01); *G01C 23/00* (2013.01); *G06F 3/0488* (2013.01)

(58) Field of Classification Search
CPC .. G05D 1/0005; G08G 5/0039; G08G 5/0021; G08G 5/0052; B64D 37/005; G06F 3/0488; G01C 23/00
See application file for complete search history.

(56) References Cited

U.S. PATENT DOCUMENTS

| | | | |
|---|---|---|---|
| 5,121,325 A | 6/1992 | DeJonge | |
| 6,507,782 B1 * | 1/2003 | Rumbo | G05D 1/0005 244/182 |

(Continued)

OTHER PUBLICATIONS

Extended EP Search Report for Application No. 18184069.5 dated Dec. 14, 2018.

(Continued)

*Primary Examiner* — Mary Cheung
(74) *Attorney, Agent, or Firm* — Lorenz & Kopf, LLP

(57) ABSTRACT

A method for computing a required speed profile for an aircraft to meet a required time of arrival (RTA) for a waypoint of a current flight is provided. During flight, the method calculates a fuel-efficient speed profile for the aircraft to meet the RTA for the waypoint, by a processor of a computing device communicatively coupled to one or more avionics systems onboard the aircraft; activates the fuel-efficient speed profile to fly the aircraft to the waypoint, by the processor; determines a priority between fuel efficiency of the fuel-efficient speed profile and time reliability, by the processor; and when the priority is the time reliability, switches from the fuel-efficient speed profile to a guidance margin control strategy to fly the aircraft to the waypoint, wherein the guidance margin control strategy increases the time reliability by enabling the aircraft to satisfy constraints of the RTA.

20 Claims, 6 Drawing Sheets

(56) References Cited

U.S. PATENT DOCUMENTS

| | | |
|---|---|---|
| 8,165,734 B2 | 4/2012 | Wachenheim et al. |
| 8,781,651 B2 | 7/2014 | Tino et al. |
| 8,788,189 B2 | 7/2014 | Polansky et al. |
| 9,540,005 B1 | 1/2017 | Howe-Veenstra et al. |
| 10,013,236 B2 * | 7/2018 | Bailey .................... G05D 1/101 |
| 2007/0150123 A1 * | 6/2007 | Combs ................. G08G 5/0052 701/3 |
| 2011/0118908 A1 * | 5/2011 | Boorman ............. G08G 5/0021 701/14 |
| 2014/0067245 A1 * | 3/2014 | Polansky ............. G05D 1/0202 701/121 |
| 2014/0257598 A1 | 9/2014 | Bailey et al. |
| 2016/0069688 A1 * | 3/2016 | Polansky ............. G05D 1/0005 701/3 |
| 2016/0358481 A1 * | 12/2016 | Vesely ..................... G08G 5/02 |

OTHER PUBLICATIONS

Shin-Yin Young, et al.; Fuel-Efficient Optimized Profile Descents With Time Control; 2015 Integrated Communications Navigation and Surveillance (ICNS) Conference, Apr. 21-23, 2015.

* cited by examiner

SYSTEMS AND METHODS FOR MAXIMIZING TIME RELIABILITY AND FUEL-EFFICIENCY FOR AN AIRCRAFT TO MEET CONSTRAINTS ASSOCIATED WITH A REQUIRED TIME OF ARRIVAL (RTA)

TECHNICAL FIELD

Embodiments of the subject matter described herein relate generally to accommodating a required time of arrival (RTA) onboard an aircraft during flight. More particularly, embodiments of the subject matter relate to optimization of a speed profile in combination with optimization of fuel-efficiency onboard an aircraft to meet an RTA.

BACKGROUND

Time of arrival control systems provide a moving vehicle, such as an aircraft, with the capability to arrive at a given location within specific time constraints. Such control systems may be used by an aircraft to meet a required time of arrival (RTA) at a destination airport or waypoint of a current flight plan. An RTA control system alters an intended speed profile in order to meet the time constraints. However, the efficiency of other flight parameters and/or aircraft factors may be reduced by altering the speed profile of the aircraft, thereby reducing the desirability of using a speed profile configured to accommodate time constraints only.

Accordingly, it is desirable to accommodate an RTA in combination with other factors during flight of the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for computing a required speed profile for an aircraft to meet a required time of arrival (RTA) for a waypoint of a current flight. During flight, the method calculates a fuel-efficient speed profile for the aircraft to meet the RTA for the waypoint, by a processor of a computing device communicatively coupled to one or more avionics systems onboard the aircraft; activates the fuel-efficient speed profile to fly the aircraft to the waypoint, by the processor; determines a priority between fuel efficiency of the fuel-efficient speed profile and time reliability, by the processor; and when the priority is the time reliability, the method switches from the fuel-efficient speed profile to a guidance margin control strategy to fly the aircraft to the waypoint, wherein the guidance margin control strategy increases the time reliability by enabling the aircraft to satisfy constraints of the RTA.

Some embodiments of the present disclosure provide a system for computing a required speed profile for an aircraft to meet a required time of arrival (RTA) for a waypoint of a current flight. The system includes system memory; and at least one processor communicatively coupled to the system memory, the at least one processor configured to: during flight, calculate a fuel-efficient speed profile for the aircraft to meet the RTA for the waypoint; activate the fuel-efficient speed profile to fly the aircraft to the waypoint; determine a priority between fuel efficiency of the fuel-efficient speed profile and time reliability; and when the priority is the time reliability, switch from the fuel-efficient speed profile to a guidance margin control strategy to fly the aircraft to the waypoint, wherein the guidance margin control strategy increases the time reliability by enabling the aircraft to satisfy constraints of the RTA.

Some embodiments of the present disclosure provide a non-transitory, computer-readable medium containing instructions thereon, which, when executed by a processor, perform a method for computing a required speed profile for an aircraft to meet a required time of arrival (RTA) for a waypoint of a current flight. During flight, the method calculates a fuel-efficient speed profile for the aircraft to meet the RTA for the waypoint, by a flight management system (FMS) onboard the aircraft; activates the fuel-efficient speed profile to fly the aircraft to the waypoint; determines a priority between fuel efficiency of the fuel-efficient speed profile and time reliability, by: determining a level of risk associated with the fuel-efficient speed profile, wherein the level of risk indicates a probability that the aircraft will not successfully arrive at the waypoint within a required time tolerance of the RTA using the fuel-efficient speed profile; when the level of risk is low, determining that the priority is the fuel efficiency; and when the level of risk is high, determining that the priority is the time reliability; and when the priority is the time reliability, the method switches from the fuel-efficient speed profile to a guidance margin control strategy to fly the aircraft to the waypoint, wherein the guidance margin control strategy increases the time reliability by enabling the aircraft to satisfy constraints of the RTA; and when the priority is the fuel efficiency, continues use of the fuel-efficient speed profile to fly the aircraft to the waypoint.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
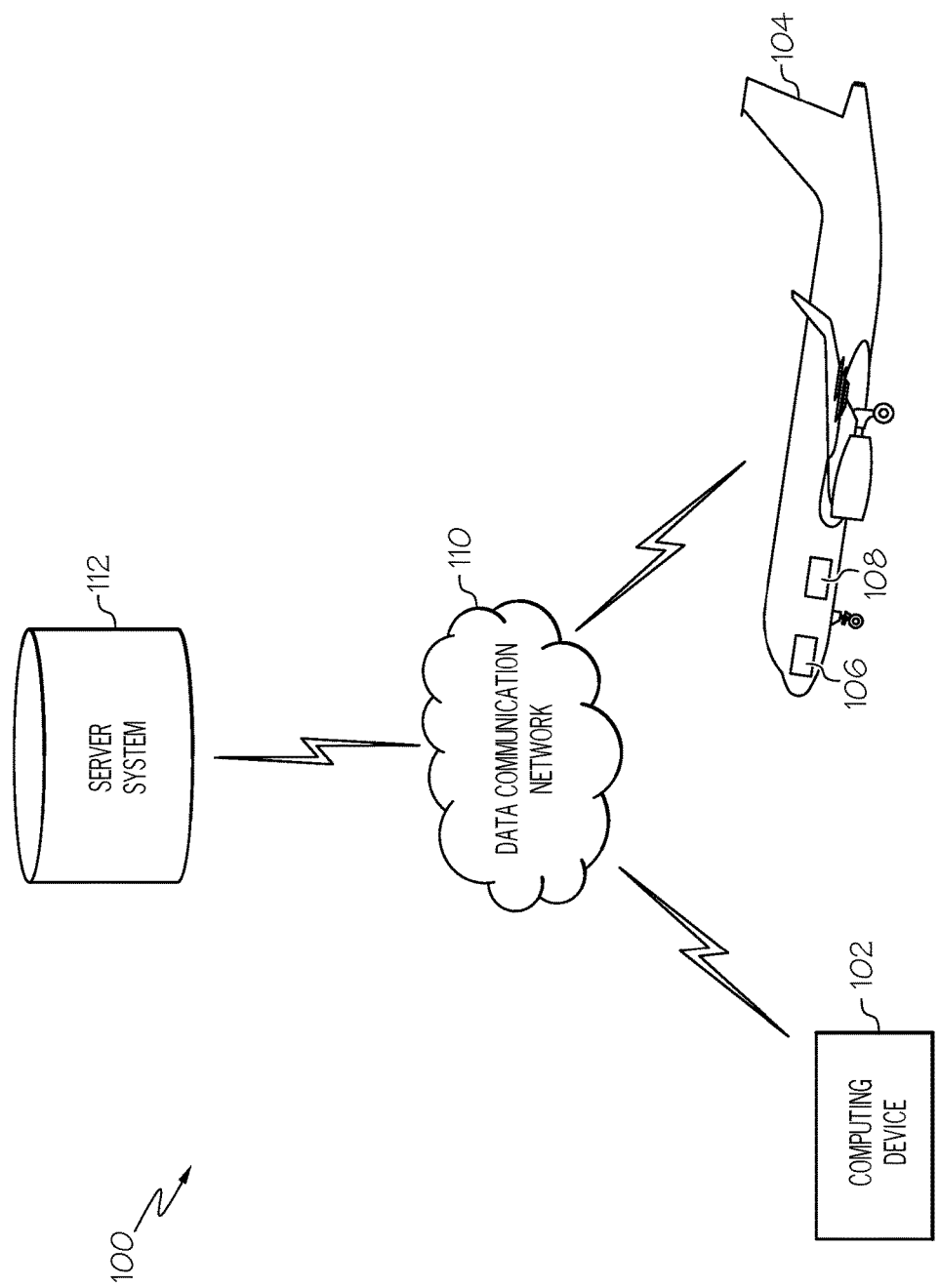
FIG. 1 is a system for optimizing a speed profile of an aircraft, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for controlling flight of an aircraft to a destination location by alternating between fuel-efficient flight strategies and time-reliable flight strategies. More specifically, the subject matter relates to continuously identifying, during flight, whether fuel-efficiency or time reliability is the current priority, based on an assessed level of risk. When the level of risk indicates that a required time of arrival (RTA) will not be satisfied using a current flight strategy, then the current flight strategy may be switched for a more appropriate flight strategy. Flight strategies may include the use of a fuel-efficient speed profile and/or the use of a guidance margin control strategy configured to increase time reliability of the current flight plan.

Certain terminologies are used with regard to the various embodiments of the present disclosure. A required time of arrival (RTA) is a time value at which an aircraft is expected, instructed, or otherwise required to arrive at a particular destination location (e.g., a destination airport, a waypoint of a flight plan). RTA values may be an exact time value, or a range of time values including an acceptable "window" of time. Time reliability and fuel-efficiency are factors affecting the ability of an aircraft to arrive at a destination airport or waypoint within constraints of a required time of arrival (RTA).

As used herein, time reliability is the reliability of meeting a time constraint while obeying the limitations of speed envelope and speed constraints. The time reliability may be measured by comparing the RTA to Time of Arrival (TOA) range limits. Time reliability is actually related to the earliest and latest predicted possible Estimated Time of Arrival (ETA) values at the RTA waypoint, and thus time reliability encompasses the "RTA speed envelope" all of the way from the current aircraft location to the RTA waypoint, along the intended flight plan. The RTA speed envelope includes: (i) a minimum allowable speed of the aircraft to meet RTA constraints for a particular destination location; and (ii) a maximum allowable speed for the aircraft to meet the RTA constraints for the RTA waypoint. Such an RTA speed envelope combines the vehicle envelope, air traffic control (ATC) imposed speed constraints, and pilot-entered RTA system limits. Fuel-efficiency is the ability of a vehicle to maximize the distance traveled by an aircraft for a given quantity of fuel. As described herein, fuel-efficiency is the ability of an aircraft to use the least amount of fuel possible to travel to a destination airport or waypoint of a flight plan. Fuel-efficiency may be expressed as a ratio of distance traveled per unit of fuel consumed.

Turning now to the figures, FIG. 1 is a system 100 for optimizing a speed profile of an aircraft, in accordance with the disclosed embodiments. The system 100 operates to dynamically compute a speed profile for the aircraft, in real-time during flight, to meet a required time of arrival (RTA) and to accommodate time reliability requirements and fuel-efficiency requirements of the flight. The system 100 may include, without limitation, a computing device 102 that communicates with a flight management system (FMS) 106 and one or more avionics systems 108 onboard the aircraft 104, and at least one server system 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. In one embodiment, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine, present, and transmit speed profile calculations. In other embodiments, the computing device 102 may be implemented using a flight management system (FMS) 106 or other computer system onboard the aircraft 104, which is configured to compute, transmit, and potentially present speed profile calculations.

The aircraft 104 may be any aviation vehicle for which a speed profile and a required time of arrival (RTA) are relevant and applicable during completion of a flight route. The aircraft 104 may be implemented as an airplane, helicopter, spacecraft, hovercraft, or the like. The one or more avionics systems 108 may include Automatic Dependent Surveillance-Broadcast (ADS-B) devices, Traffic Collision Avoidance System (TCAS) devices, Enhanced Ground Proximity Warning System (EGPWS) devices, air data computers, navigation devices, weather radar, brake systems, or the like. Data obtained from the one or more avionics systems 108 may include, without limitation: flight plan data, navigation data, air data, weather data, aircraft performance data, fuel status data, or the like.

The server system 112 may include any number of application servers, and each server may be implemented using any suitable computer. In some embodiments, the server system 112 includes one or more dedicated computers. In some embodiments, the server system 112 includes one or more computers carrying out other functionality in addition to server operations. The server system 112 may store and provide any type of data used to dynamically compute and update a speed profile for the aircraft 104 during flight. Such data may include, without limitation: flight plan data, atmospheric forecast (wind and temperature) data, air traffic data, and other data compatible with the computing device 102.

The computing device 102 may be located onboard the aircraft 104 or implemented as a ground server, and the computing device 102 communicates with the FMS 106 and the one or more avionics systems 108 via wired and/or wireless communication connection. The computing device 102 and the server system 112 are generally disparately located, and the computing device 102 communicates with the server system 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 obtains relevant data associated with fuel-efficiency, time reliability, a current flight plan, a current RTA, wind data, temperature forecast data, and a current speed profile from the FMS 106, the one or more avionics systems 108, and the remote server system 112. The computing device 102 then uses the relevant data to determine a current, real-time priority between time reliability and fuel-efficiency, and to compute an updated speed profile for the aircraft 104 to accommodate the identified priority. In embodiments where the computing device 102 is implemented by the FMS 106, the updated speed profile is computed, retained, and executed during flight. In embodiments where the computing device 102 is implemented by a computer system or personal computing device separate and distinct from the FMS 106, the computing device 102 transmits the updated speed profile to the FMS 106 for use during flight.

Figure 2:
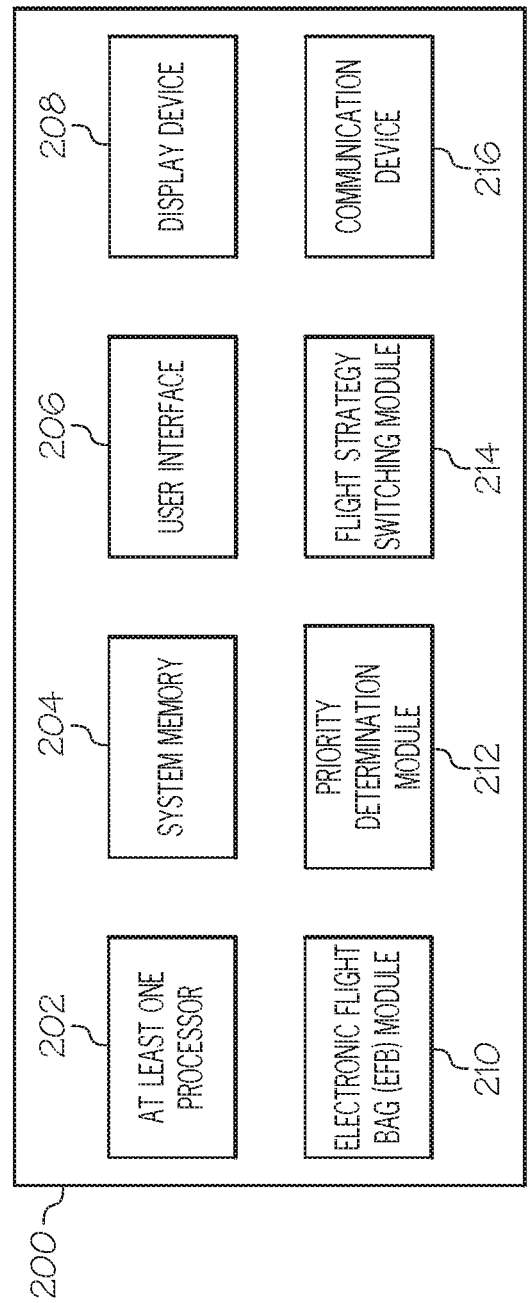
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a user interface 206; a display device 208; an Electronic Flight Bag (EFB) module 210; a priority determination module 212; a flight strategy switching module 214; and a communication device 216. These elements and features of the computing device 200 may be operatively associated with one another, coupled to one another, or otherwise configured to cooperate with one another as needed to support the desired functionality—in particular, dynamically computing and providing an updated speed profile onboard an aircraft during flight, based on an identified prioritization of time reliability or fuel-efficiency, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the speed profile computing and updating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with dynamically computing and updating a speed profile for an aircraft, during flight, and graphical elements associated with the updated speed profile. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide a user input activation of an updated prioritization of time reliability or fuel-efficiency, and updated speed profile computations based on the prioritization, as described herein.

In certain embodiments, the user interface 206 may include or cooperate with various features to allow a user to interact with the computing device 200 via graphical elements rendered on a display element (e.g., display device 208). Accordingly, the user interface 206 may initiate the creation, maintenance, and presentation of a graphical user interface (GUI). In certain embodiments, the display device 208 implements touch-sensitive technology for purposes of interacting with the GUI. Thus, a user can manipulate the GUI by moving a cursor symbol rendered on the display device 208, or by physically interacting with the display device 208 itself for recognition and interpretation, via the user interface 206.

The display device 208 is configured to display various icons, text, and/or graphical elements associated with one or more Electronic Flight Bag (EFB) applications, prioritization of time reliability and fuel-efficiency characteristics, current and updated speed profile data, or the like. In an exemplary embodiment, the display device 208 is communicatively coupled to the user interface 206 and the at least one processor 202. The at least one processor 202, the user interface 206, and the display device 208 are cooperatively configured to display, render, or otherwise convey one or more graphical representations or images associated with updated speed profile computations on the display device 208, as described in greater detail below. In an exemplary embodiment, the display device 208 is realized as an electronic display configured to graphically display updated speed profile data, as described herein. In some embodiments, the computing device 200 is an integrated computer system onboard an aircraft, and the display device 208 is located within a cockpit of the aircraft, and is thus implemented as an aircraft display. In other embodiments, the display device 208 is implemented as a display screen of a standalone, personal computing device (e.g., laptop computer, tablet computer). It will be appreciated that although the display device 208 may be implemented using a single display, certain embodiments may use additional displays (i.e., a plurality of displays) to accomplish the functionality of the display device 208 described herein.

The Electronic Flight Bag (EFB) module 210 is used in embodiments wherein the computing device 200 is implemented as a personal computing device that is not necessarily integrated into the aircraft. The EFB module 210 is configured to present graphical elements and electronic information associated with one or more EFB applications used to assist flight crew members to perform flight management tasks via the computing device 200. The EFB module 210 hosts one or more aviation-specific software applications used to automate processes performed onboard an aircraft and/or for flight purposes. The methods and processes for performing prioritization of fuel-efficiency and time reliability, and speed profile updating techniques described herein, may be implemented using the EFB module 210 of the computing device 200.

The priority determination module 212 is configured to determine a priority for a current flight strategy for the aircraft. The priority determination module 212 evaluates aircraft parameters and flight plan parameters to determine whether time reliability or fuel-efficiency is a current priority for the aircraft. The priority determination module 212 performs this evaluation continuously throughout the flight, and provides updated priority computations during the flight. Time reliability and fuel-efficiency are factors affecting the ability of an aircraft to arrive at a destination airport or waypoint within constraints of a required time of arrival (RTA). As used herein, time reliability is the reliability of meeting a speed constraint, which may be measured by the difference of the commanded speed profile approaching the time constraint waypoint and the limits of the speed envelope at that point in the trajectory. Fuel-efficiency is the ability of a vehicle to maximize the distance traveled by an aircraft for a given quantity of fuel. As described herein, fuel-efficiency is the ability of an aircraft to use the least amount of fuel possible to travel to a destination airport or waypoint of a flight plan. Fuel-efficiency may be expressed as a ratio of distance traveled per unit of fuel consumed.

The priority determination module 212 prioritizes the importance of one of two relevant factors: (1) fuel-efficiency, and (2) time reliability. When the priority determination module 212 determines that the fuel-efficient solution to meeting the time constraint uses speeds near the extreme values of RTA speed envelope, then the fuel-efficient solution is considered unreliable and the priority is shifted to time reliability.

The flight strategy switching module 214 is configured to alternate between flight strategies (e.g., speed profiles, flight control strategies) which maximize time reliability or fuel-efficiency of an aircraft during flight to a time constrained waypoint. Alternating between flight strategies may be referred to as "switching". Initially, the flight strategy switching module 214 calculates and activates a fuel-efficient speed profile using a flight management system (FMS) onboard the aircraft. Such a fuel-efficient speed profile is calculated by a flight management system (FMS) using well-known and commonly accepted techniques. The fuel-efficient speed profile achieves fuel-efficiency for the aircraft by calculating a speed adjustment required for correction of a time error, and spreading the calculated speed adjustment along an entire trajectory, wherein the trajectory extends from the current location of the aircraft to a destination location (e.g., a destination airport, a waypoint of the flight plan). During flight, the flight strategy switching module 214 continuously monitors the current priority (determined by the priority determination module 212) and either (i) maintains a current flight strategy based on the priority, or (ii) switches to a new flight strategy, based on the priority. In practice, the switching back and forth between priorities is minimized using hysteresis, and the condition for choosing priority is adjusted slightly depending upon which mode is current.

In practice, the EFB module 210, the priority determination module 212, and/or the flight strategy switching module 214 may be implemented with (or cooperate with) the at least one processor 202 to perform at least some of the functions and operations described in more detail herein. In this regard, the EFB module 210, the priority determination module 212, and/or the flight strategy switching module 214 may be realized as suitably written processing logic, application program code, or the like.

The communication device 216 is suitably configured to communicate data between the computing device 200 and one or more remote servers, a flight management system (FMS), and/or one or more avionics systems onboard an aircraft. The communication device 216 may transmit and receive communications over a wireless local area network (WLAN), the Internet, a satellite uplink/downlink, a cellular network, a broadband network, a wide area network, or the like. As described in more detail below, data received by the communication device 216 may include, without limitation: flight plan data, runway analysis data, weather data, and other data compatible with the computing device 200. The communication device 216 is configured to receive any data relevant to the prioritization of time reliability and fuel-efficiency and to the computation of an updated speed profile during flight. Data provided by the communication device 216 may include, without limitation, user selections to activate and deactivate processes for prioritization of time reliability and fuel-efficiency and for computation of an updated speed profile during flight, and the like.

Figure 3:
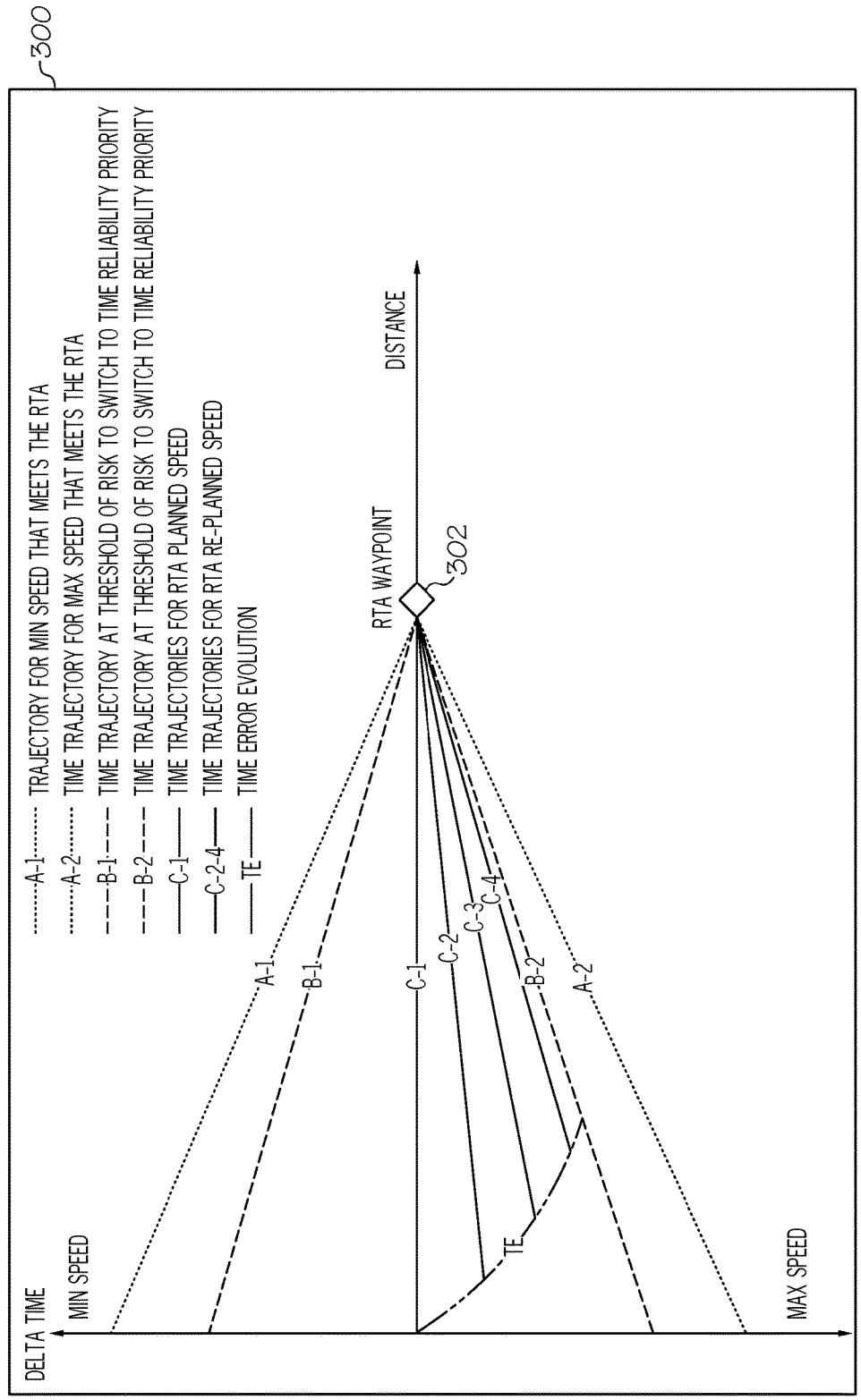
FIG. 3 is a diagram of optimization of time trajectories for an aircraft, in accordance with the disclosed embodiments.

FIG. 3 is a diagram 300 that depicts a simplified representation of evolution of the fuel optimal trajectories to meet a time constraint in the presence of errors, in accordance with an exemplary implementation of the disclosed embodiments. The horizontal axis is distance along the flight plan and the vertical axis is the time difference between the original predicted profile to meet the RTA and the current profile from the current aircraft state. As shown, the A-1 line reflects a time profile for minimum allowable speed of the aircraft to meet required time of arrival (RTA) constraints for a particular destination location (e.g., the RTA waypoint 302). The A-2 line reflects the time profile for maximum allowable speed for the aircraft to meet the RTA constraints for the RTA waypoint 302. When the aircraft gets outside these "speed boundary" lines, the aircraft is unable to meet the RTA. Thus, the A-1 and A-2 lines form a barrier around acceptable speed profiles to accommodate the RTA. The B-1 and B-2 lines reflect a conservative "padded" version of the A-1 and A-2 lines, wherein the B-1 and B-2 lines permit a predefined quantity of error in the wind forecast for the flight. The C-1 to C-5 lines are predicted time trajectories. The C-1 line is the original predicted profile to meet the RTA, and C-2 through C-5 lines are updated time trajectories produced after speed profile updates that occur in response to an increasing time error due to a steady un-forecast and unfavorable wind.

The diagram 300 depicts how a flight situation evolves, over time, in the presence of a steady wind error that persists throughout a flight to RTA waypoint 302, wherein a steady wind error is a difference between actual and forecast wind. As the aircraft flies with the steady wind error, the aircraft diverges from an originally planned time trajectory, and a combination of flight control strategies (e.g., fuel-efficient control, time reliable control) are applied, in order to alter the current time trajectories to comply with the constraints of the RTA for the RTA waypoint 302. A guidance margin control strategy activates when the aircraft time diverges from the plan by a sufficient amount (or equivalently, the re-predicted Estimated Time of Arrival (ETA) at the RTA waypoint 302 has diverged from the RTA by a sufficient amount).

When the guidance margin control strategy is not active, or when the speed adjustment authority of the guidance margin control strategy is less than the wind error, then the ETA error at the RTA waypoint 302 increases. When the ETA error at the RTA waypoint 302 is large enough, the long-term solution is re-planned, resulting in another C-x (x=2-4) time trajectory plan line that ends at the RTA Waypoint 302. This cycle repeats when there is a wind error that is greater than the speed adjustment authority of the guidance margin control strategy. Eventually, the actual time trajectory of the aircraft (the TE line) will cross the B-2 line—which represents a point at which the fuel-efficient solution to meet the time constraint exceeds a tolerable level of risk of reliably meeting the time constraint. When the level of risk exceeds the threshold, the priority is switched time reliability and the guidance margin control strategy is engaged. With the guidance margin control strategy active, the speed control is more aggressive to meet the time constraint, and the actual time trajectory would ideally no longer diverge to the edge of the RTA speed envelope, and may even cross back over the B-2 line and allow a return to fuel-efficient speed strategy.

Figure 4:
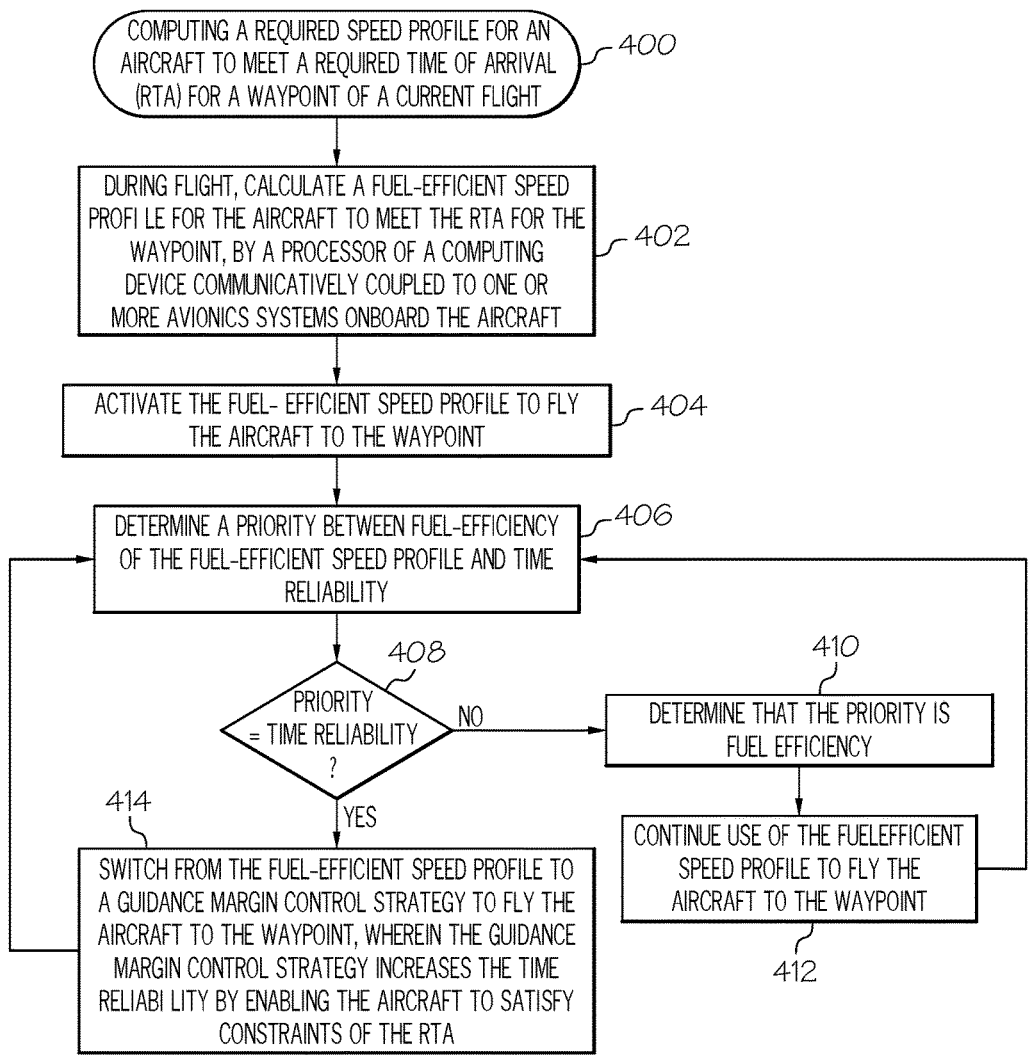
FIG. 4 is a flow chart that illustrates an embodiment of a process for computing a required speed profile for an aircraft to meet a required time of arrival (RTA) for a waypoint of a current flight, in accordance with the disclosed embodiments.

FIG. 4 is a flow chart that illustrates an embodiment of a process 400 for computing a required speed profile for an aircraft to meet a required time of arrival (RTA) for a waypoint of a current flight, in accordance with the disclosed embodiments. For ease of description and clarity, it is assumed that the process 400 begins during flight of an aircraft, by calculating a fuel-efficient speed profile for the aircraft to meet the RTA for the waypoint, by a processor of a computing device communicatively coupled to one or more avionics systems onboard the aircraft (step 402).

The process 400 is capable of computing the fuel-efficient speed profile using any appropriate computing device communicatively coupled to the avionics systems onboard the aircraft. In some embodiments, the process 400 calculates the fuel-efficient speed profile using a flight management system (FMS) or other integrated computer system onboard the aircraft that is communicatively coupled to the FMS and avionics systems onboard the aircraft. In other embodiments, the process 400 calculates the fuel-efficient speed profile using a standalone computing device (e.g., a laptop computer, a tablet computer) communicatively coupled, via wired or wireless connection, to the FMS and avionics systems onboard the aircraft. In other embodiments, the process 400 calculates the fuel-efficient speed profile using a ground server or other ground-based computer system communicatively coupled to the FMS and the avionics systems onboard the aircraft.

When calculated outside of the FMS, the fuel-efficient speed profile may be transmitted to the FMS for use onboard the aircraft. Fuel-efficiency is the ability of a vehicle to maximize the distance traveled by an aircraft for a given quantity of fuel. In the context of an aircraft, fuel-efficiency is the ability of the aircraft to use the least amount of fuel possible to travel to a destination airport or waypoint of a current flight plan. Fuel-efficiency may be expressed as a ratio of distance traveled per unit of fuel consumed. Thus, a fuel-efficient speed profile uses aircraft settings which enable the aircraft to travel to the next waypoint of the flight plan using a minimal amount of fuel. Here, the process 400 uses techniques that are well-known and commonly used in the art to calculate a fuel-efficient speed profile.

The process 400 then activates the fuel-efficient speed profile to fly the aircraft to the waypoint (step 404), using the FMS onboard the aircraft. During flight, the process 400 determines a priority between fuel-efficiency of the fuel-efficient speed profile and time reliability (step 406). One suitable methodology for determining the priority between fuel-efficiency and time reliability is described below with reference to FIG. 5. A second suitable methodology for determining the priority between fuel-efficiency and time reliability is described below with reference to FIG. 6. Determining the priority, or in other words, "prioritization" between fuel-efficiency and time reliability indicates the importance of one of two relevant factors: (1) fuel-efficiency, and (2) time reliability. When the process 400 determines that minimizing the amount of fuel used to travel to the destination is more important than meeting the time constraints associated with the RTA, then the priority is the fuel-efficiency. When the process 400 determines that meeting the time constraints associated with the RTA is more important than minimizing the amount of fuel used to travel to the destination, then the priority is the time reliability.

When the priority is not time reliability (the "No" branch of 408), then the process 400 determines that the priority is fuel-efficiency (step 410). Here, the process 400 continues use of the fuel-efficient speed profile to fly the aircraft to the waypoint (step 412), and returns to step 406 to continue determining a priority between fuel-efficiency and time reliability (step 406). However, when the priority is time reliability (the "Yes" branch of 408), then the process 400, switches from the fuel-efficient speed profile to a guidance margin control strategy to fly the aircraft to the waypoint, wherein the guidance margin control strategy increases the time reliability by enabling the aircraft to satisfy constraints of the RTA (step 414). The process 400 then returns to step 406 to determine a priority between fuel-efficiency and time reliability (step 406), as a continuous process, throughout the remainder of the flight.

The guidance margin control strategy includes enabling a speed adjustment applied to the fuel-efficient speed profile that increases the time reliability of the aircraft arriving at a destination location within constraints associated with the RTA. The guidance margin control strategy is described in detail in U.S. Pat. No. 8,788,189, which is incorporated by reference herein. The process 400 implements the guidance margin control strategy to ensure that the aircraft arrives at the destination location (e.g., destination airport, flight plan waypoint) within the time constraints of the RTA, wherein the emphasis of the flight strategy is time reliability instead of fuel-efficiency. The guidance margin control strategy includes techniques for enabling a temporary speed correction to a long term speed profile that compensates for unpredicted environmental errors, by: (i) computing a time error as a difference between an estimated time of arrival (ETA) and a required time of arrival (RTA) without the use of a guidance margin, wherein the guidance margin is a target speed modification that would delay or prevent re-computation of the long-term speed profile along the trajectory; (ii) setting, by a flight management system (FMS), a guidance speed as the target speed required to reach the waypoint at the RTA plus an updated guidance margin; (iii) computing the guidance margin to delay or prevent a long term speed profile computation and reach the waypoint at the RTA if the time error exceeds an interval determined by a first positive time threshold and a first negative time threshold, which change in magnitude as the distance to the waypoint decreases; (iv) setting a guidance margin to zero and setting the guidance speed to equal the target speed plus the guidance margin if a time error reduces under a second positive time threshold and a second negative time threshold; and (v) repeating from the computing of the time error.

Figure 5:
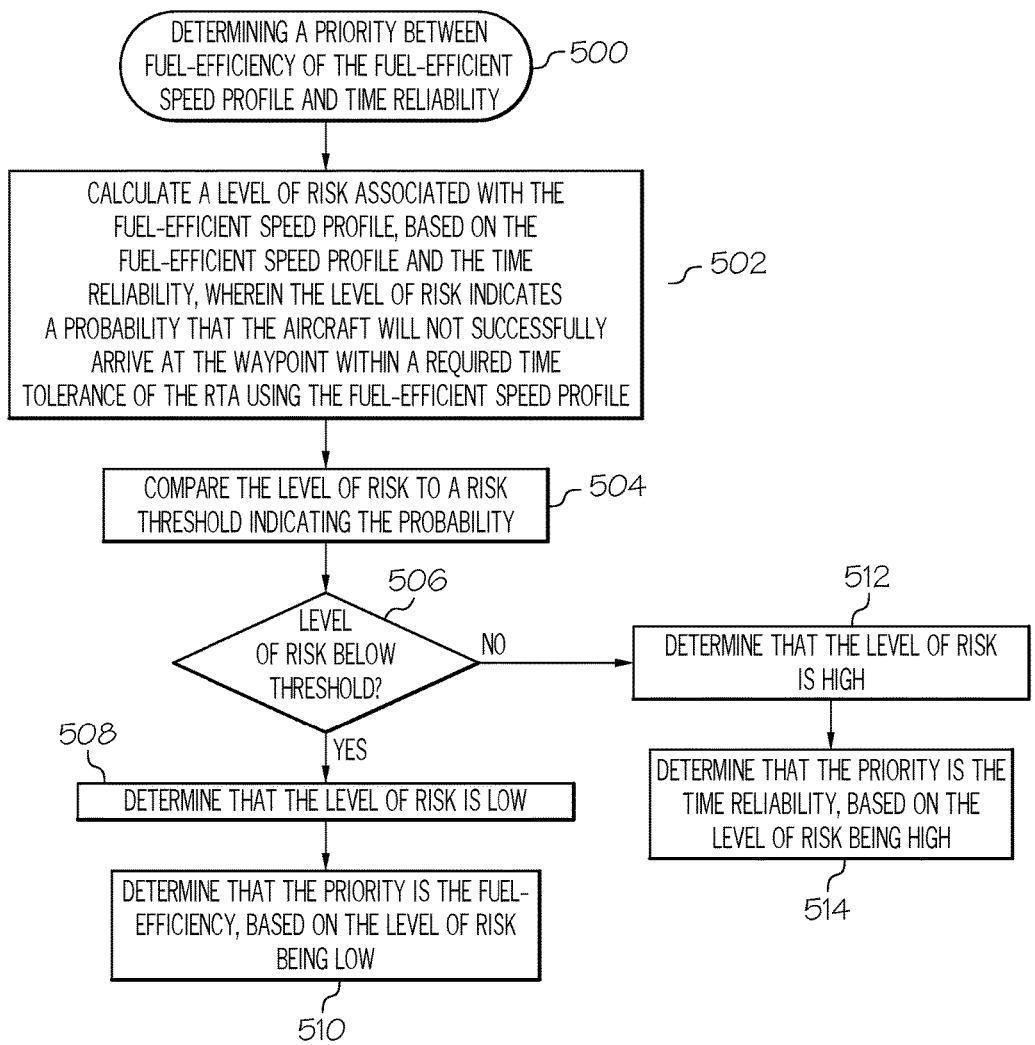
FIG. 5 is a flow chart that illustrates an embodiment of a process for determining a priority between fuel-efficiency of the fuel-efficient speed profile and time reliability.

FIG. 5 is a flow chart that illustrates an embodiment of a process 500 for determining a priority between fuel-efficiency of the fuel-efficient speed profile and time reliability. It should be appreciated that the process 500 described in FIG. 5 represents one embodiment of step 406 described above in the discussion of FIG. 4, including additional detail. First, the process 500 calculates a level of risk associated with the fuel-efficient speed profile, based on the fuel-efficient speed profile and the time reliability, wherein the level of risk indicates a probability that the aircraft will not successfully arrive at the waypoint within a required time tolerance of the RTA using the fuel-efficient speed profile (step 502). The risk is calculated by comparing a "padded" earliest or latest Estimated Time of Arrival (ETA) to the RTA time, wherein the "pad" used includes a predefined threshold of uncertainty against which the RTA is robust. For example, in situations wherein the RTA system can tolerate ten (10) knots of unforecast and unfavorable wind, then the "padded" earliest ETA and the "padded" latest ETA must assume that there are ten (10) knots of unforecast, unfavorable wind all the way to the RTA waypoint. Additionally, in some embodiments, the process 500 includes a capability to prevent switching when particular conditions are met. In this scenario, the process 500 may prevent switching when a predicted level of fuel at the destination is within a predefined threshold of the required reserve fuel.

The process 500 then compares the level of risk to a risk threshold indicating the probability (step 504). The risk threshold is a baseline risk value that separates whether the fuel-efficient speed profile is low-risk and therefore reliable, or whether the fuel-efficient speed profile is high-risk and therefore unreliable. When the level of risk is below the threshold (the "Yes" branch of 506), then the process 500 determines that the level of risk is low (step 508). Here, the level of risk is low, indicating a high probability that the aircraft will arrive at a destination location (e.g., destination airport, flight plan waypoint) within time constraints of an RTA. Thus, use of the fuel-efficient speed profile is low-risk and is deemed reliable. In certain embodiments, the time constraints associated with the RTA include an exact time value at which the aircraft is required to arrive at the destination location. In some embodiments, the time constraints associated with the RTA include a range of time values, or in other words, a window of time at which the aircraft is required to arrive at the destination location.

When the level of risk is not below the threshold (the "No" branch of 506), then the process 500 determines that the level of risk is high (step 512). Here, the level of risk is high, indicating a low probability that the aircraft will arrive at a destination location (e.g., destination airport, flight plan waypoint) within time constraints of an RTA. Thus, use of the fuel-efficient speed profile is high-risk and is deemed unreliable. The aircraft may or may not arrive at the destination location within time constraints of the RTA, when using the fuel-efficient speed profile. The process 500 determines that the priority is the time reliability, based on the level of risk being high (step 514). At this point in the process 500, as detailed in FIG. 4, the fuel-efficient speed profile has already been computed and activated, and is in current use by the aircraft. The process 500 has determined whether the priority for the aircraft is fuel-efficiency or time reliability by assessing the risk associated with fuel-efficiency to identify times when it is appropriate to switch to a control strategy that maximizes time reliability.

Figure 6:
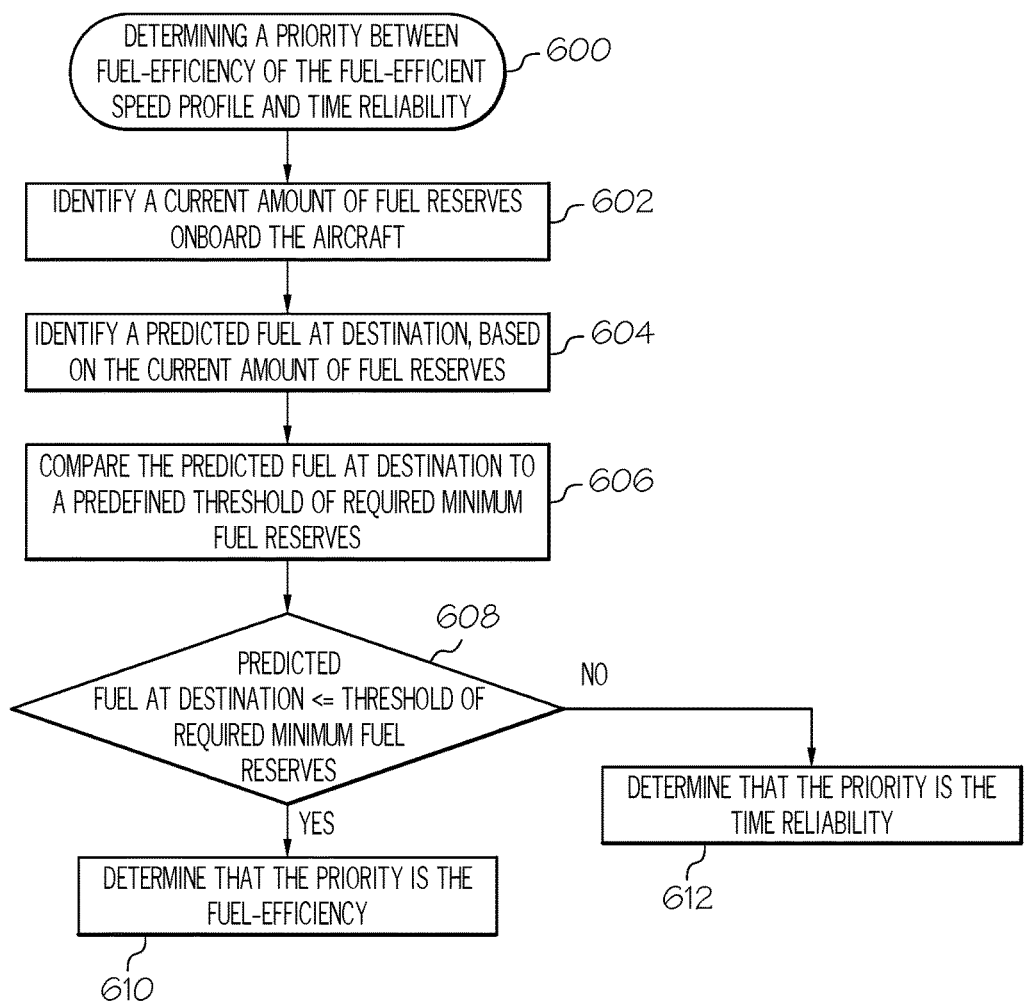
FIG. 6 is a flow chart that illustrates a second embodiment of a process for determining a priority between fuel-efficiency of the fuel-efficient speed profile and time reliability.

FIG. 6 is a flow chart that illustrates a second embodiment of a process 600 for determining a priority between fuel-efficiency of the fuel-efficient speed profile and time reliability. It should be appreciated that the process 600 described in FIG. 6 represents one embodiment of step 406 described above in the discussion of FIG. 4, including additional detail. First, the process 600 identifies a current amount of fuel reserves onboard the aircraft (step 602), and identifies a predicted fuel at destination, based on the current amount of fuel reserves (step 604). Next, the process 600 compares the predicted amount of fuel at destination to a predefined threshold of required minimum fuel reserves (step 606).

When the predicted amount of fuel at destination is less than or equal to the predefined threshold of required minimum fuel reserves (the "Yes" branch of 608), the process 600 then determines that the priority is the fuel-efficiency (step 610). Here, the process 600 determines that the amount of fuel predicted to be onboard the aircraft when the aircraft reaches a destination waypoint or destination airport is less than an amount of fuel that is required to be kept in reserve onboard the aircraft. Thus, the amount of fuel onboard the aircraft will be less than required. In this case, the process 600 determines that fuel-efficiency is the priority, to ensure that the aircraft retains the maximum amount of fuel while en route to the destination waypoint or destination airport.

However, when the predicted amount of fuel at destination is not less than or equal to the predefined threshold of required minimum fuel reserves (the "No" branch of 608), the process 600 then determines that the priority is the time reliability (step 612). In this scenario, the aircraft is predicted to carry more fuel than required (i.e., more than the required minimum fuel reserves) when the aircraft arrives at the destination waypoint or destination airport. Therefore, the process 600 permits the priority to be shifted from a fuel-efficiency priority (i.e., a focus on conserving fuel) to a time reliability priority (i.e., a focus on arriving at the destination as quickly as possible).

The various tasks performed in connection with processes 400-600 may be performed by software, hardware, firmware, or any combination thereof. For illustrative purposes, the preceding descriptions of processes 400-600 may refer to elements mentioned above in connection with FIGS. 1-3. In practice, portions of processes 400-600 may be performed by different elements of the described system. It should be appreciated that processes 400-600 may include any number of additional or alternative tasks, the tasks shown in FIGS. 4-6 need not be performed in the illustrated order, and processes 400-600 may be incorporated into a more comprehensive procedure or process having additional functionality not described in detail herein. Moreover, one or more of the tasks shown in FIGS. 4-6 could be omitted from embodiments of the processes 400-600 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for computing a speed profile for an aircraft to meet a required time of arrival (RTA) for a waypoint of a current flight, the method comprising:

calculating a fuel-efficient speed profile for the aircraft to meet the RTA for the waypoint, by a processor of a computing device communicatively coupled to one or more avionics systems onboard the aircraft;

activating the fuel-efficient speed profile to fly the aircraft to the waypoint, by the processor;

during use of the fuel-efficient speed profile, determining a padded estimated time of arrival (ETA) for the waypoint using the fuel-efficient speed profile;

determining, by the processor, time reliability is a priority based on a relationship between the padded ETA and the RTA; and when the priority is the time reliability, switching from the fuel-efficient speed profile to a guidance margin control strategy to fly the aircraft to the waypoint, wherein the guidance margin control strategy increases the time reliability by enabling the aircraft to satisfy constraints of the RTA.

2. The method of claim 1, further comprising:

after switching to the guidance margin control strategy, determining a second priority between the fuel efficiency and the time reliability, wherein the priority is associated with a first point in time of the current flight, wherein the second priority is associated with a second point in time of the current flight, and wherein the second point is later in time than the first point; and when the second priority is the time reliability, continuing use of the guidance margin control strategy to fly the aircraft to the waypoint to successfully meet the RTA.

3. The method of claim 2, further comprising:

when the second priority is the fuel efficiency, switching back to the fuel-efficient speed profile to fly the aircraft to the waypoint.

4. The method of claim 1, wherein determining the priority further comprises:

determining a level of risk associated with the fuel-efficient speed profile based at least in part on the padded ETA, wherein the level of risk indicates a probability that the aircraft will not successfully arrive at the waypoint within a required time tolerance of the RTA using the fuel-efficient speed profile; and when the level of risk is low, determining that the priority is the fuel efficiency.

5. The method of claim 4, further comprising:

when the level of risk is high, determining that the priority is the time reliability; and switching from the fuel-efficient speed profile to the guidance margin control strategy, in response to determining that the priority is the time reliability.

6. The method of claim 4, wherein determining the level of risk further comprises:

calculating the level of risk, based on the fuel-efficient speed profile and the time reliability;

comparing the level of risk to a risk threshold indicating the probability that the aircraft will not successfully arrive at the waypoint within the required time tolerance of the RTA using the fuel-efficient speed profile;

when the level of risk is below the risk threshold, determining that the level of risk is low; and when the level of risk is above the risk threshold, determining that the level of risk is high.

7. The method of claim 1, wherein the padded ETA comprises an earliest or latest ETA for the waypoint.

8. The method of claim 1, wherein the padded ETA assumes an unforecast wind throughout flight to the waypoint.

9. The method of claim 1, wherein:

the fuel-efficient speed profile uses a least amount of fuel to meet the RTA for the waypoint;

the padded ETA comprises an earliest or latest ETA for the waypoint assuming an unforecast wind throughout flight to the waypoint; and the guidance margin control strategy comprises a speed correction to that compensates for the unforecast wind and is influenced by a difference between an ETA for the waypoint and the RTA.

10. A system for computing a speed profile for an aircraft to meet a required time of arrival (RTA) for a waypoint of a current flight, the system comprising:

system memory; and at least one processor communicatively coupled to the system memory, the at least one processor configured to:

calculate a fuel-efficient speed profile for the aircraft to meet the RTA for the waypoint;

activate the fuel-efficient speed profile to fly the aircraft to the waypoint;

during use of the fuel-efficient speed profile, determine a padded estimated time of arrival (ETA) for the waypoint using the fuel-efficient speed profile;

determine time reliability is a priority based on a relationship between the padded ETA and the RTA; and when the priority is the time reliability, switch from the fuel-efficient speed profile to a guidance margin control strategy to fly the aircraft to the waypoint, wherein the guidance margin control strategy increases the time reliability by enabling the aircraft to satisfy constraints of the RTA.

11. The system of claim 10, wherein the system comprises a flight management system (FMS) onboard the aircraft.

12. The system of claim 10, wherein the system further comprises a communication device configured to transmit data to a flight management system (FMS); and wherein the at least one processor is further configured to switch from the fuel-efficient speed profile to the guidance margin control strategy by transmitting a data message to the FMS, via the communication device.

13. The system of claim 10, wherein, after switching to the guidance margin control strategy, the at least one processor is further configured to:

determine a second priority between the fuel efficiency and the time reliability, wherein the priority is associated with a first point in time of the current flight, wherein the second priority is associated with a second point in time of the current flight, and wherein the second point is later in time than the first point; and when the second priority is the time reliability, continuing use of the guidance margin control strategy to fly the aircraft to the waypoint to successfully meet the RTA.

14. The system of claim 13, wherein, when the second priority is the fuel efficiency, the at least one processor is further configured to switch back to the fuel-efficient speed profile to fly the aircraft to the waypoint.

15. The system of claim 10, wherein the at least one processor is configured to determine the priority by:

determining a level of risk associated with the fuel-efficient speed profile based at least in part on the padded ETA, wherein the level of risk indicates a probability that the aircraft will not successfully arrive at the waypoint within a required time tolerance of the RTA using the fuel-efficient speed profile; and when the level of risk is low, determining that the priority is the fuel efficiency.

16. The system of claim 15, wherein, when the level of risk is high, the at least one processor is further configured to:
    determine that the priority is the time reliability; and
    switch from the fuel-efficient speed profile to the guidance margin control strategy, in response to determining that the priority is the time reliability.

17. The system of claim 15, wherein the at least one processor is configured to determine the level of risk by:
    calculating the level of risk, based on the fuel-efficient speed profile and the time reliability;
    comparing the level of risk to a risk threshold indicating the probability that the aircraft will not successfully arrive at the waypoint within the required time tolerance of the RTA using the fuel-efficient speed profile;
    when the level of risk is below the risk threshold, determining that the level of risk is low; and
    when the level of risk is above the risk threshold, determining that the level of risk is high.

18. A non-transitory, computer-readable medium containing instructions thereon, which, when executed by a processor, perform a method for computing a speed profile for an aircraft to meet a required time of arrival (RTA) for a waypoint of a current flight, the method comprising:
    calculating a fuel-efficient speed profile for the aircraft to meet the RTA for the waypoint, by a flight management system (FMS) onboard the aircraft;
    activating the fuel-efficient speed profile to fly the aircraft to the waypoint;
    determining a padded estimated time of arrival (ETA) for the waypoint using the fuel-efficient speed profile during use of the fuel-efficient speed profile;
        determining a priority between fuel efficiency of the fuel-efficient speed profile and time reliability, by:
            determining a level of risk associated with the fuel-efficient speed profile based on a relationship between the padded ETA and the RTA, wherein the level of risk indicates a probability that the aircraft will not successfully arrive at the waypoint within a required time tolerance of the RTA using the fuel-efficient speed profile; when the level of risk is low, determining that the priority is the fuel efficiency; when the level of risk is high, determining that the priority is the time reliability;
    when the priority is the time reliability, switching from the fuel-efficient speed profile to a guidance margin control strategy to fly the aircraft to the waypoint, wherein the guidance margin control strategy increases the time reliability by enabling the aircraft to satisfy constraints of the RTA; and
    when the priority is the fuel efficiency, continuing use of the fuel-efficient speed profile to fly the aircraft to the waypoint.

19. The non-transitory, computer-readable medium of claim 18, wherein the method further comprises:
    after switching to the guidance margin control strategy, determining a second priority between the fuel efficiency and the time reliability, wherein the priority is associated with a first point in time of the current flight, wherein the second priority is associated with a second point in time of the current flight, and wherein the second point is later in time than the first point; and
    when the second priority is the time reliability, continuing use of the guidance margin control strategy to fly the aircraft to the waypoint to successfully meet the RTA.

20. The non-transitory, computer-readable medium of claim 19, wherein the method further comprises:
    when the second priority is the fuel efficiency, switching back to the fuel-efficient speed profile to fly the aircraft to the waypoint.

* * * * *